United States Patent
Song et al.

(10) Patent No.: US 9,972,839 B2
(45) Date of Patent: May 15, 2018

(54) NEGATIVE ACTIVE MATERIAL, METHOD OF PREPARING THE SAME, NEGATIVE ELECTRODE INCLUDING THE SAME, AND LITHIUM SECONDARY BATTERY INCLUDING THE NEGATIVE ELECTRODE

(71) Applicant: Samsung Electronics Co., Ltd., Suwon-si, Gyeonggi-do (KR)

(72) Inventors: Min-sang Song, Seongnam-si (KR); Ka-hee Shin, Suwon-si (KR); Ja-man Choi, Hwaseong-si (KR); Moon-seok Kwon, Hwaseong-si (KR); Jeong-kuk Shon, Hwaseong-si (KR); Jong-hyeok Park, Suwon-si (KR); Seung-sik Hwang, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 447 days.

(21) Appl. No.: 14/061,891

(22) Filed: Oct. 24, 2013

(65) Prior Publication Data

US 2014/0120418 A1 May 1, 2014

(30) Foreign Application Priority Data

Oct. 25, 2012 (KR) ........................ 10-2012-0119288

(51) Int. Cl.
*H01M 4/48* (2010.01)
*C01G 23/047* (2006.01)
(Continued)

(52) U.S. Cl.
CPC ............... *H01M 4/48* (2013.01); *B82Y 30/00* (2013.01); *C01G 23/047* (2013.01);
(Continued)

(58) Field of Classification Search
CPC ... B82Y 30/00; C01G 23/047; C01P 2002/82; C01P 2004/03; C01P 2004/04;
(Continued)

(56) References Cited

U.S. PATENT DOCUMENTS

2008/0286656 A1 11/2008 Cho et al.
2012/0152336 A1* 6/2012 Cao ....................... B82Y 30/00
136/254

FOREIGN PATENT DOCUMENTS

JP 2008-034368 A 2/2008
JP 2008-117625 A 5/2008
(Continued)

OTHER PUBLICATIONS

Shin, K. et al., "Controlled Synthesis of Skein Shaped TiO2-B Nanotube Cluster Particles with Outstanding Rate Capability", Chemical Communications, vol. 49, pp. 2326-2328, Feb. 1, 2013.*
(Continued)

*Primary Examiner* — Miriam Stagg
*Assistant Examiner* — Lilia Nedialkova
(74) *Attorney, Agent, or Firm* — Cantor Colburn LLP

(57) ABSTRACT

A negative active material, a method of preparing the same, and a lithium secondary battery including the negative electrode. The negative active material includes a plurality of titanium oxide nanotubes, wherein the Raman shift of the negative active material includes a characteristic peak located at a Raman shift between about 680 $cm^{-1}$ and about 750 $cm^{-1}$.

16 Claims, 10 Drawing Sheets

(51) Int. Cl.
 H01M 4/485 (2010.01)
 B82Y 30/00 (2011.01)
 H01M 10/052 (2010.01)
(52) U.S. Cl.
 CPC ......... *H01M 4/485* (2013.01); *C01P 2002/82* (2013.01); *C01P 2004/03* (2013.01); *C01P 2004/04* (2013.01); *C01P 2004/13* (2013.01); *C01P 2004/54* (2013.01); *C01P 2004/61* (2013.01); *C01P 2004/62* (2013.01); *C01P 2004/64* (2013.01); *C01P 2006/12* (2013.01); *C01P 2006/14* (2013.01); *C01P 2006/16* (2013.01); *C01P 2006/40* (2013.01); *H01M 10/052* (2013.01)
(58) Field of Classification Search
 CPC .............. C01P 2004/13; C01P 2004/54; C01P 2004/61; C01P 2004/62; C01P 2004/64; C01P 2006/12; C01P 2006/14; C01P 2006/16; C01P 2006/40; H01M 10/052; H01M 4/48; H01M 4/485
 See application file for complete search history.

(56) References Cited

FOREIGN PATENT DOCUMENTS

| JP | 2012-030989 A | 2/2012 |
| KR | 1020050042763 A | 5/2005 |
| KR | 1020110043400 A | 4/2011 |

OTHER PUBLICATIONS

Morgan, D.L. et al., "Relationship of Titania Nanotube Binding Energies and Raman Spectra", ICONN 2006, pp. 60-63, Jul. 2006.*

Kim, S.-J. et al., "Characterization of Hydrothermally Prepared Titanate Nanotube Powders by Ambient and in Situ Raman Spectroscopy", Journal of Physical Chemistry Letters, vol. 1, pp. 130-135, Nov. 10, 2009.*

Yu, J. and Yu, H., "Facile synthesis and characterization of novel nanocomposites of titanate nanotubes and rutile nanocrystals", Materials Chemistry and Physics, vol. 100, pp. 507-512, Mar. 9, 2006.*

Zhang, H. et al., "Electrochemical Lithium Storage of Sodium Titanate Nanotubes and Nanorods", Electrochimica Acta, vol. 53, pp. 7061-7068, May 23, 2008.*

Qamar, M. et al. "Effect of post treatments on the structure and thermal stability of titanate nanotubes", Nanotechnology, vol. 17, pp. 5922-5929, published Nov. 22, 2006.*

Katoh, R. et al. "Effect of the Particle Size on the Electron Injection Efficiency of Dye-Sensitized Nanocrystalline TiO2 Films Studied by TRMC Measurements", vol. 111, pp. 10741-10746, published Jun. 20, 2007.*

Inaba et al., "TiO2(B) as a promising high potential negative electrode for large-size lithium-ion batteries", Journal of Power Sources, 189, 2009, pp. 580-584.

Choi et al., "Lithium-ion battery anode properties of TiO2 nanotubes prepared by the hydrothermal synthesis of mixed (anatase and rutile) particles", Electrochimica Acta, 55, 2010, pp. 5975-5983.

Armstrong et al., "TiO2-B Nanowires", Angew. Chem. Int. Ed., 43, 2004, pp. 2286-2288.

Jankulovska et al., "A comparison of quantum-sized anatase and rutile nanowire thin films: Devising differences in the electronic structure from photoelectrochemical measurements", Electrochimica Acta, 62, 2012, pp. 172-180.

Notice of Non-Final Office Action for Korean Patent Application No. 10-2012-0119288 dated Mar. 26, 2018.

* cited by examiner

NEGATIVE ACTIVE MATERIAL, METHOD OF PREPARING THE SAME, NEGATIVE ELECTRODE INCLUDING THE SAME, AND LITHIUM SECONDARY BATTERY INCLUDING THE NEGATIVE ELECTRODE

CROSS-REFERENCE TO RELATED APPLICATIONS

This application claims priority to and the benefit of Korean Patent Application No. 10-2012-0119288, filed on Oct. 25, 2012, and all the benefits accruing therefrom under 35 U.S.C. § 119, the content of which is incorporated herein in its entirety by reference.

BACKGROUND

1. Field

The present disclosure relates to a negative active material, methods of preparing the same, a negative electrode including the same, and a lithium secondary battery including the negative electrode.

2. Description of the Related Art

A currently used secondary battery includes a positive electrode, a negative electrode, an electrolyte, and a separator membrane. In the negative electrode, graphite is used as a negative active material.

Recently, research has been actively pursued to develop a high capacity silicon-based compound, a high capacity tin-based transition metal oxide, and a highly stable lithium titanium oxide ($Li_4Ti_5O_{12}$) because the theoretical capacity of graphite has almost been reached, and the lithium secondary battery market has expanded from small-sized batteries for IT applications to medium to large-sized batteries for automobiles and power storage devices. Lithium titanium oxide has received attention because it exhibits a charge and discharge voltage 1.5 V higher than that of graphite, and has high thermal stability, high reversibility, and excellent high rate capability. However, the specific capacity of lithium titanium oxide is about 170 milliampere-hours per gram (mAh/g), and thus, titanium oxide has a lower specific capacity than currently commercialized graphite. Thus there remains a need for an improved negative electrode material.

SUMMARY

Provided is a negative active material including a plurality of titanium oxide nanotubes, wherein the Raman spectrum of the negative active materials includes a characteristic peak located at a Raman shift between about 680 cm$^{-1}$ and about 750 cm$^{-1}$.

Provided are methods of manufacturing the negative active material.

Provided is a negative electrode including the negative active materials.

Provided is a lithium secondary battery including the negative electrodes.

Additional aspects will be set forth in part in the description which follows and, in part, will be apparent from the description.

According to an aspect, a negative active material includes a plurality of titanium oxide nanotubes, wherein a Raman spectrum of the negative active material includes a characteristic peak located at a Raman shift between about 680 cm$^{-1}$ and about 750 cm$^{-1}$ in a Raman spectrum.

The Raman spectrum of the negative active material may include at least one of a characteristic peak of an anatase-type titanium dioxide and a characteristic peak of a bronze-type titanium dioxide.

The negative active material may include a microparticle, wherein the microparticle may include a cluster of a plurality of titanium oxide nanotubes.

The microparticle may be a skein-shaped particle of a plurality of titanium oxide nanotubes.

The microparticle may have a volume average particle diameter (D50) in a range of about 1 micrometer (μm) to about 20 μm.

The negative active material may have a specific surface area in a range of about 230 square meters per gram (m$^2$/g) to about 300 m$^2$/g, a pore volume in a range of about 0.4 cubic centimeters per gram (cc/g) to about 0.9 cc/g, and an average pore size in a range of about 5 nanometers (nm) to about 9 nm.

The titanium oxide may be represented by Formula 1:

$$Ti_{1+x}O_{2+y}\qquad\text{Formula 1}$$

wherein, x and y satisfy −0.2≤x≤0.2 and −0.2≤y≤0.2, respectively.

According to another aspect, a method of preparing the negative electrode is disclosed.

In an embodiment, the method includes: hydrothermally contacting a first titanium oxide nanotube and an alkali metal hydroxide to prepare a first microparticle including a cluster of alkali metal titanate nanotubes; exchanging an alkali metal ion of the first microparticle with a hydrogen ion to prepare a second microparticle i a cluster of hydrogen titanate nanotubes; and annealing the second microparticle to prepare a third microparticle including a cluster of second titanium oxide nanotubes to prepare the negative active material.

The method may include preparing a first microparticle including a cluster of sodium titanate nanotubes by a hydrothermal reaction of a first titanium oxide nanotube and sodium hydroxide; preparing a second microparticle including a cluster of hydrogen titanate nanotubes by exchanging a sodium ion with a hydrogen ion of the first microparticle; and preparing a third microparticle including a cluster of second titanium oxide nanotubes by annealing the second microparticle.

The first titanium oxide nanotube may be a negative active material with a specific surface area in a range of about 30 square meters per gram (m$^2$/g) to about 100 m$^2$/g, a pore volume in a range of about 0.1 cc/g to about 0.6 cc/g and an average pore size in a range of about 9 nm to about 15 nm.

The first titanium oxide nanotube may be prepared by anodizing and heat treating a titanium thin film.

The heat treatment may be performed at a temperature of about 350° C. to about 500° C.

The annealing may be performed at a temperature of about 300° C. to about 500° C.

The Raman spectrum of the second titanium oxide nanotube may partially not match the Raman spectrum of the first titanium oxide nanotube.

According to another aspect, a negative electrode including the negative active material is provided.

According to another aspect, a negative electrode includes: a composite of the negative electrode material of claim 1; and a binder, wherein the composite is disposed on a current collector.

According to another aspect, a lithium secondary battery including the negative electrode is provided.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
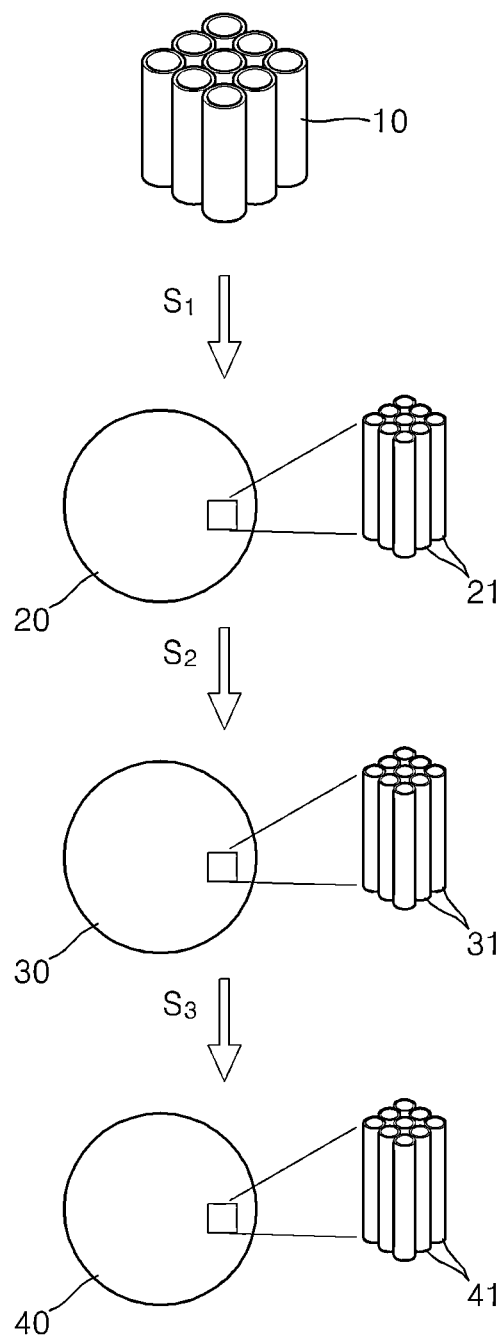
FIG. 1 is a schematic illustration of an embodiment of a method of preparing a negative active material and a structure of an embodiment of the negative active material prepared in accordance with the method.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A bronze-phase polymorph of titanium dioxide ($TiO_2$—B) has a high theoretical capacity of 305 mAh/g and exhibits a charge and discharge voltage of about 1.6 V, which is similar to that of lithium titanium oxide. While not wanting to be bound by theory, it is understood that the higher voltage avoids problems such as electrolyte decomposition upon charge and discharge. However, because the kinetic properties of the bronze phase titanium dioxide are poor, its theoretical capacity cannot be provided, and it has the disadvantages of comparatively poor rate capability and short lifespan. To overcome these problems, the bronze phase titanium dioxide may be made in the form of a nanostructure in order to improve the lithium ion diffusion rate during intercalation of the $TiO_2$—B. While not wanting to be bound by theory, it is understood that when the bronze phase titanium dioxide is made into a nanostructure, the capacity of the materials may be increased because a lithium diffusion length is shortened, while at the same time the cross section of the lithium diffusion is increased. Thus, nanostructuring of particles can be helpful to improve the electrode capacity of the bronze phase titanium dioxide ($TiO_2$—B).

Generally, a nanotube structure has a much larger specific surface area than a particle structure or a rod structure. Also, intercalation and deintercalation are easier in the case of the nanotube structure. When manufacturing a nanotube of bronze phase titanium dioxide, an anatase-type titanium dioxide particle may be used as a starting material, and a hydrothermal method can be used to obtain a nanotube with an outer diameter greater than or equal to about 20 nanometers (nm), and a pore size greater than or equal to about 10 nm. However, to obtain a comparatively high specific capacity, sizes of the outer diameter and the average pore size are desirably precisely controlled.

In particular, if a negative active material is in a form having individual nanometer-sized particles, an undesirable amount of binder may be used when the negative active material is coated on a current collector in a slurry form. Also, when the negative active material is mixed with the binder and a conducting material within a large capacity mixer, the negative active material may not be suitably dispersed and the prepared slurry may not be suitable for coating the electrode, resulting in difficulties in commercialization.

Disclosed is a negative active material, a method of preparing the same, a negative electrode, and a lithium secondary battery having improved properties.

According to an aspect, the negative active material comprises titanium oxide nanotubes.

Figure 5:
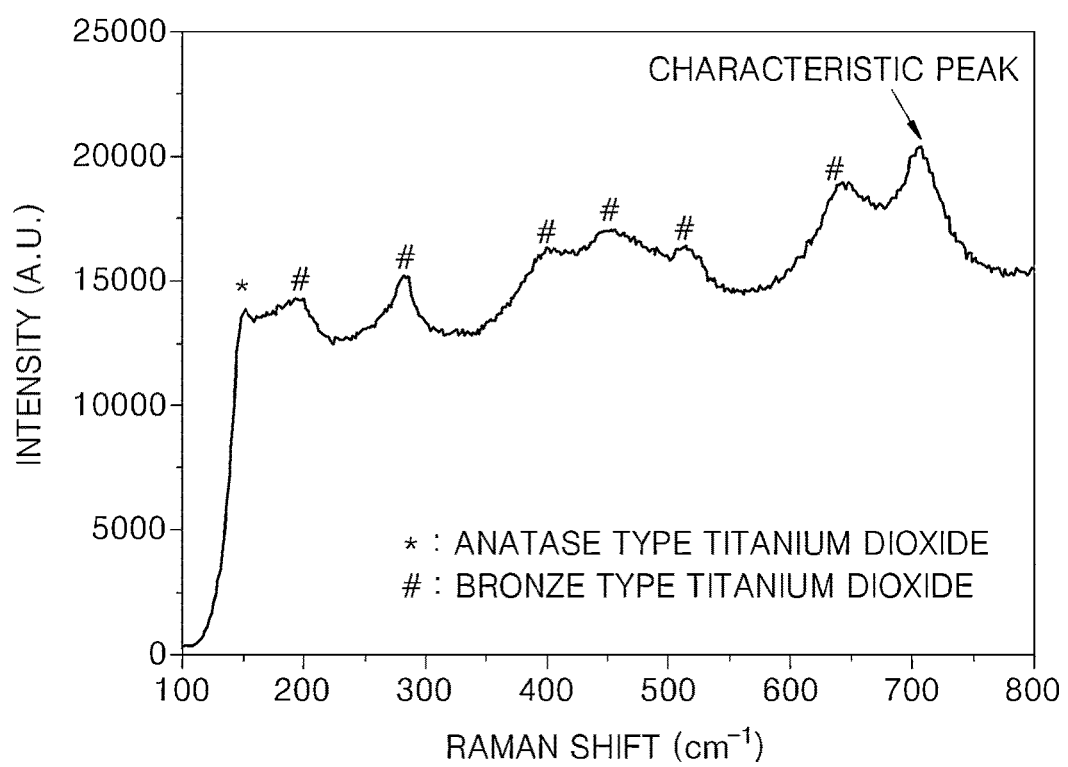
FIG. 5 is graph of intensity (arbitrary units, a.u. versus Raman shift (inverse centimeters, $cm^{-1}$) and is a Raman spectrum of the negative active material prepared in Example 1.

The Raman spectrum of the negative active material has a characteristic peak located at a Raman shift between about 680 inverse centimeters (cm$^{-1}$) and about 750 cm$^{-1}$ (see FIG. 5).

Figure 6:
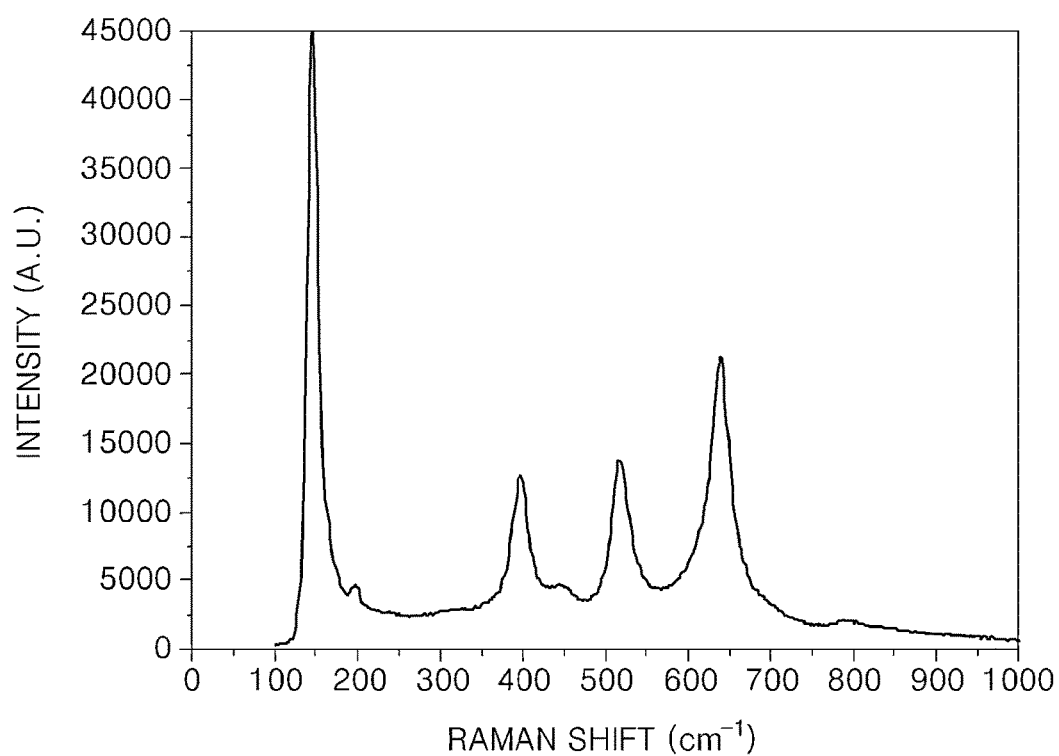
FIG. 6 is graph of intensity (arbitrary units, a.u. versus Raman shift (inverse centimeters, $cm^{-1}$) and is a Raman spectrum of an anatase-type titanium oxide.

The Raman spectrum of the negative active material may further have at least one of a characteristic peak of an anatase-type titanium dioxide (see FIG. 5) and a characteristic peak of a bronze-type titanium dioxide (see FIG. 6). The anatase titanium dioxide is disclosed in "A Comparison of Quantum-Sized Anatase and Rutile Nanowire Thin Film, Milena Jankulovska, Electrochimica Acta, vol 62, 172-180, 2012 Dec. 13," the content of which is incorporated herein by reference in its entirety, and the bronze phase titanium dioxide is disclosed in "TiO$_2$—B Nanowires, A. Robert Armstrong, Angew. Chem. Int. Ed. 43, 2286-2288, 2004 Apr. 19," the content of which is incorporated herein by reference in its entirety.

The negative active material may comprise a microparticle, wherein the microparticle may comprise a cluster of a plurality of titanium oxide nanotubes. The term "microparticle" used herein refers to a particle with a volume average particle diameter (D50) of about 1 μm to about 20 μm. The term "volume average particle diameter (D50)" used herein refers to a diameter that corresponds to 50% of the total volume of a powder composed of the microparticles in terms of the volume average particle diameter. Hence, the volume average particle diameter refers to a diameter that corresponds to 50% of the total volume when the volume of the microparticles is accumulated from particles of the smallest size in ascending order until the accumulated volume reaches 50% of the total volume of the microparticles. The volume average particle diameter (D50) may be measured by using a wet type laser method using a MicroTrack HRA (manufactured by Nikkiso Co.), a laser type particle size distribution measurement device.

Since the negative active material includes the microparticle, less binder may be used, e.g., in a slurry comprising the negative active material, as compared to the case when the negative active material is present in the form of a nanometer-sized individual particle, for example, a titanium oxide nanoparticle, nanowire particle, nanotube particle, or a combination of these particles. Thus a slurry suitable for forming an electrode via coating may be obtained because the constituents within the slurry are better distributed. Thus, the negative active material is suitable for commercialization, and when the negative electrode including the negative active material is used for a lithium secondary battery, the charge and discharge characteristics of the battery may be improved.

The microparticle, for example, may include a cluster of titanium oxide nanotubes. A titanium oxide nanotube of the plurality of titanium oxide nanotubes may have a length of about 0.01 micrometer (μm) to about 100 μm, specifically about 0.1 μm to about 50 μm, a diameter of about 0.5 nm to about 50 nm, specifically about 1 nm to about 25 nm, and an aspect ratio (length/diameter) of about 100,000,000 to about 10, specifically about 10,000,000 to about 100, more specifically about 1,000,000 to about 1000. The plurality of titanium oxide nanotubes may have an average length of about 0.01 micrometer (μm) to about 100 μm, specifically about 0.1 μm to about 50 μm, an average diameter of about 0.5 nm to about 50 nm, specifically about 1 nm to about 25 nm, and an average aspect ratio (length/diameter) of about 100,000,000 to about 10, specifically about 10,000,000 to about 100, more specifically about 1,000,000 to about 1000.

The microparticle may be a skein-shaped particle. The skein-shaped particle may comprise a cluster of the titanium oxide nanotubes, e.g., a tangled cluster of the titanium oxide nanotubes.

The microparticle may have a volume average particle diameter (D50) in a range of about 1 μm to about 20 μm, for example, about 8 to about 15 μm, specifically about 2 μm to about 18 μm, more specifically about 4 μm to about 16 μm.

The negative active material may have a specific surface area in a range of about 150 square meters per gram (m$^2$/g) to about 350 m$^2$/g, specifically about 230 m$^2$/g to about 300 m$^2$/g, more specifically about 250 m$^2$/g to about 280 m$^2$/g, a pore volume in a range of about 0.2 cubic centimeters per gram (cc/g) to about 1 cc/g, specifically about 0.4 cc/g to about 0.9 cc/g, more specifically about 0.5 cc/g to about 0.8 cc/g, and an average pore size in a range of about 2 nm to about 20 nm, specifically about 5 nm to about 9 nm, more specifically about 6 nm to about 8 nm. The terms "specific surface area," "pore volume," and "average pore size" used herein refer to values measured by the Brunauer-Emmett-Teller ("BET") method.

The titanium oxide may be represented by Formula 1 below:

$$Ti_{1+x}O_{2+y} \quad \text{Formula 1}$$

wherein, x and y satisfy −0.2≤x≤0.2 and −0.2≤y≤0.2, respectively.

Herein, according to an aspect and with reference to FIG. 1, a method of preparing a negative active material is described in further detail.

In FIG. 1, the method of preparing the negative active material, according to an aspect, comprises (S$_1$) hydrothermally contacting a first titanium oxide nanotube 10 and an alkali metal hydroxide to prepare a first microparticle 20, wherein the first microparticle 20 comprises a cluster of alkali metal titanate nanotubes 21, e.g., a cluster of sodium titanate (for example, Na$_2$Ti$_3$O$_7$) nanotubes, by a hydrothermal reaction of the first titanium oxide nanotube 10 and the alkali metal hydroxide (not shown). The alkali metal hydroxide may be LiOH, NaOH, or KOH, or a combination thereof. NaOH is specifically mentioned. The method also comprises (S$_2$) exchanging an alkali metal ion of the first microparticle with a hydrogen ion to prepare a second microparticle 30 comprising a cluster of hydrogen titanate nanotubes 31 prepared by ion exchange (substitution) of alkali metal ions, e.g., sodium ions, with hydrogen ions. The method further comprises ($S_3$) annealing the second microparticle 30 to prepare a third microparticle 40 including a cluster of the second titanium oxide nanotube 41.

The first titanium oxide nanotube 10 may be in the form of a powder. The first titanium oxide nanotube 10 may be a $TiO_2$ nanotube with a specific surface area in a range of about 10 $m^2/g$ to about 200 $m^2/g$, specifically about 30 $m^2/g$ to about 100 $m^2/g$, more specifically about 40 $m^2/g$ to about 90 $m^2/g$, a pore volume in a range of about 0.01 cc/g to 1 cc/g, specifically about 0.1 cc/g to 0.6 cc/g, more specifically about 0.2 cc/g to 0.5 cc/g, and an average pore size in a range of about 1 nm to about 30 nm, specifically about 9 nm to about 15 nm, more specifically about 10 nm to about 14 nm. Also, the first titanium oxide nanotube 10 may be prepared by anodizing and heat treating a titanium thin film. The term "anodization treatment" used herein refers to electrochemically converting titanium metal into a titanium oxide by operating an electrochemical cell including a titanium thin film as a positive electrode, and another metal (for example, platinum) thin film as a negative electrode, in an aqueous electrolyte (for example, an aqueous solution of perchloric acid).

The heat treatment may be performed in a temperature range of about 300° C. to about 550° C., specifically about 350° C. to about 500° C., more specifically about 400° C. to about 450° C. If the heat treatment temperature is performed within this range, a titanium oxide nanotube (the first titanium oxide nanotube 10) with a high degree of crystallinity, e.g., 75% to 99.9% crystallinity, and having a nanotube structure may be obtained. The heat treatment may be performed for about 1 to about 10 hours, specifically about 3 to about 6 hours, more specifically about 4 to about 5 hours.

In step ($S_1$) for preparing the first microparticle 20, the alkali metal hydroxide may be in the form of an aqueous solution. For example, a sodium hydroxide aqueous solution prepared by dissolving the sodium hydroxide in deionized water may be used. Herein, the concentration of the alkali metal hydroxide aqueous solution may be in a range of about 8 molar (M) to about 20 M, specifically about 10 M to about 18 M, for example, about 15 M.

The hydrothermal reaction may be performed in a temperature range of about 130° C. to about 250° C., specifically about 150° C. to about 180° C., for example at 170° C., and the hydrothermal reaction may be performed for about 10 to about 100 hours, specifically for 72 hours, for example, while the reaction time may be selected in accordance with the reaction temperature.

In step ($S_2$) or preparing the second microparticle 30, the ion exchange may be performed by adding the alkali metal titanate, e.g., sodium titanate, into an acidic solution and agitating the mixture. Herein, the agitating may be performed for 1 to 10 hours, specifically 3 hours, at room temperature (a temperature of approximately 25° C.) and at a high temperature (for example, in a temperature range of about 35° C. to about 100° C., specifically about 45° C. to about 70° C.) in the stated order. By including a high temperature agitation, an ion exchange reaction rate may be increased. As the acidic solution, for example, an aqueous solution of hydrochloric acid or an aqueous solution of nitric acid may be used.

In preparing the third microparticle 40, the annealing may be performed at a temperature range of about 250° C. to about 550° C., specifically about 300° C. to about 500° C., more specifically about 350° C. to about 450° C. If the annealing temperature is within this range, a microparticle including a cluster of bronze-type titanium oxide nanotubes (a cluster of the second titanium oxide nanotube 41) with high degree of crystallinity, e.g., 75% to 99.9% crystallinity, may be obtained. The annealing may be performed for about 1 to about 10 hours, specifically about 3 to about 4 hours, more specifically about 3.5 hours.

The Raman spectrum of the second titanium oxide nanotube 41 may be different than the Raman spectrum of the first titanium oxide nanotube 10. While not wanting to be bound by theory, it is understood that because the Raman spectra of the second titanium oxide nanotube and the first titanium oxide nanotube are different, the second titanium oxide nanotube 41 has a different physical and/or a chemical structure from the first titanium oxide nanotube 10 (see FIG. 2 vs. FIG. 3A to FIG. 3C), and has a larger specific surface area, a larger pore volume and a smaller average pore size compared to the first titanium oxide nanotube 10 (see FIG. 2, FIG. 3A to FIG. 3C, and Table 1).

According to an aspect, a negative electrode includes the negative active material.

The negative electrode may additionally include an additional negative active material suitable for a lithium secondary battery other than the aforementioned negative active material.

As the other negative active material, a carbonaceous materials such as graphite that may intercalate and deintercalate lithium ions or carbon; lithium metal; alloy of lithium metal; silicon oxide based materials may be used.

The negative electrode may additionally include any suitable binder and/or any suitable conducting material other than the aforementioned electrode active materials.

The binder may facilitate a bond between the constituents such as the negative active material and the conducting material, and a coherence (e.g., adhesion) between the negative electrode and a current collector. Examples of the binder include polyvinylidene difluoride, polyvinyl alcohol, carboxymethyl cellulose ("CMC"), starch, hydroxypropyl cellulose, regenerated cellulose, polyvinylpyrrolidone, tetrafluoroethylene, polyethylene, polypropylene, ethylene-propylene-diene monomer ("EPDM"), sulfonated EPDM, styrene-butadiene-rubber, and fluorinated rubber. A combination comprising at least one of the foregoing, or a copolymer thereof, may be used.

The content of the above binder may be in a range of about 1 to about 10 parts by weight, for example, in a range of about 2 to about 7 parts by weight, based on 100 parts by weight of the total weight of the negative active material. If the binder content is within the foregoing range (e.g., about 1 to about 10 parts by weight), the coherence of the negative electrode to the current collector may be strong.

The conducting material may comprise any suitable conducting material and is not specifically limited, as long as it does not induce an undesirable chemical reaction in the lithium secondary battery including the conducting material, and has suitable electrical conductivity.

The conducting material may include, for example, a carbonaceous material such as carbon black, carbon fiber, or graphite. The carbon black, for example, may comprise acetylene black, Ketjen black, super P, channel black, furnace black, lamp black, thermal black, or a combination thereof. The graphite may comprise a natural graphite or an artificial graphite.

The negative electrode may additionally include an additional electroconductive material in addition to the aforementioned carbonaceous electroconductive material.

The additional electroconductive material may comprise an electrically conductive fiber such as a metal fiber; a metal powder such as a fluorinated carbon powder, an aluminum powder, or a nickel powder; a conductive whisker such as a zinc oxide or a potassium titanate; or polyphenylene derivatives. A combination comprising at least one of the foregoing can be used.

The negative active material may have electroconductive and active properties, and thus the amount of the electroconductive material may be smaller compared to the case where a negative material not having these properties is used. The content of the electroconductive material may be in a range of about 0.01 to about 10 parts by weight, specifically about 0.5 to about 10 parts by weight, for example, may be in a range of about 0.01 to about 5 parts by weight, based on 100 part by weight of the negative active material. If the content of the electroconductive material is within the range (e.g., about 0.5 to about 10 parts by weight), the negative electrode with improved ion conductivity may be obtained.

An example of a method of preparing the negative electrode is disclosed in further detail below.

First, a composition for forming a negative active material layer may be prepared by combining the negative active material, the binder, the solvent, and optionally the carbonaceous electroactive material, and/or another electroconductive material.

Thereafter, the composition for forming the negative active material layer may be coated on a negative electrode current collector and dried to produce a negative electrode.

The thickness of the negative electrode current collector may be in a range of about 3 μm to about 500 μm. The negative electrode current collector is not limited as long as the current collector has a suitable conductivity and does not induce an undesirable chemical change in the lithium secondary battery including the negative electrode current collector. For example, the negative electrode current collector may include copper; stainless steel; aluminum; nickel; titanium; heat treated carbon; copper or stainless steel whose surface is treated with carbon, nickel, titanium or silver; or an aluminum-cadmium alloy. A combination comprising at least one of the foregoing may be used. Also, in common with the positive electrode current collector, a coherence of the negative active material with respect to the negative electrode current collector may be increased by forming a minute concavity or convexity on the surface of the negative electrode current collector, and the negative electrode current collector may be used in various forms such as a film, sheet, foil, net, porous material, foam, or a non-woven fabric.

N-methyl pyrrolidone (NMP), acetone, water, or a combination thereof may be used as a solvent. The content of the solvent may be in a range of about 1 to about 50 parts by weight, based on 100 parts by weight of the negative active material. If the content of the solvent is within the range, the operation of forming the active material layer may be facilitated.

According to an aspect, a lithium secondary battery includes the negative electrode.

The lithium secondary battery has an excellent capacity characteristic as well as an excellent lifespan and a high-rate discharge characteristic. The term "high-rate discharge characteristic" used herein refers to a ratio of actually discharged capacity of a fully charged cell when the cell is discharged completely in a time shorter than a standard time (for example, less than 10 hours, e.g., at a C rate), with respect to an actually discharged capacity of the fully charged cell when the cell is discharged completely during the standard time (for example, 10 hours, e.g., at a C/10 rate).

Hereinafter, according to an aspect, a method of preparing the lithium secondary battery will be disclosed in further detail.

First, a negative electrode may be prepared using the aforementioned method.

Next, a positive electrode may be prepared using the method similar to the method of preparing the negative electrode. Then, a composition for forming the positive electrode active material layer may be prepared by combining a lithium transition metal oxide, a binder, an electroconductive material, and a solvent. Thereafter, the positive electrode may be prepared by coating the composition for forming the positive electrode active material layer on the positive electrode current collector and drying the composition for forming the positive electrode active material layer.

The types and the contents of the binder, the electroconductive material, and the solvent used to prepare the composition for forming the positive electrode active material layer may be the same as those for preparing the composition for forming the negative active material layer.

As the lithium transition oxide, $LiCoO_2$, $LiNiO_2$, $LiMnO_2$, $Li Mn_2O_4$, $Li(Ni_aCo_bMn_c)O_2$ (wherein $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (wherein $0\leq Y<1$), $LiMn_{2-z}Ni_zO_4$, $LiMn_{2-z}Co_zO_4$ (wherein $0<Z<2$), $LiCoPO_4$, $LiFePO_4$, or a combination thereof may be used.

The thickness of the positive electrode current collector may be in a range of about 3 μm to about 500 μm, the positive electrode current collector is not limited as long as the current collector has suitable electrical conductivity and does not induce an undesirable chemical change in the lithium secondary battery including the positive electrode current collector. The positive electrode current collector may include, for example, stainless steel; aluminum; nickel; titanium; heat treated carbon; aluminum or stainless steel whose surface is treated with carbon, nickel, titanium, silver or the like, or a combination thereof. The coherence of a positive electrode material with respect to the positive electrode current collector may be increased by forming a minute concavity or convexity on the surface of the positive electrode current collector and the negative electrode current collector may be used in various forms such as a film, sheet, foil, net, porous material, foam and non-woven fabric.

The lithium secondary battery may be completed by interposing a separator between the positive electrode and the negative electrode and supplying an organic liquid electrolyte thereto.

The lithium secondary battery may be prepared by, for example, by laminating the negative electrode, the separator, and the positive electrode in the stated order, winding or folding the laminated material, and inserting the laminated material into a cylindrical or rectangular battery case or a pouch and then injecting an organic electrolyte solution into the battery case or the pouch.

The separator with a pore diameter, e.g., average pore diameter, in a range of about 0.01 μm to about 10 μm and a thickness in a range of about 5 μm to about 300 μm is generally used. For example, a sheet or a non-woven fabric comprising an olefin-based polymer such as polypropylene or polyethylene; or a glass fiber may be used.

The organic electrolyte solution may be prepared by dissolving a lithium salt in an organic solvent.

The organic solvent may comprise propylene carbonate, ethylene carbonate, fluoroethylene carbonate, butylene carbonate, dimethyl carbonate, diethyl carbonate, methyl ethyl carbonate, methylpropyl carbonate, ethylpropyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxolane, dioxane, 1,2-dimethoxyethane, sulfolane, sulforane, dichloroethane, chlorobenzene, nitrobenzene, diethyleneglycol, dimethylether, or a combination thereof.

The lithium salt may comprise $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a combination thereof.

According to another aspect, in a lithium secondary battery, an organic solid electrolyte and/or an inorganic solid electrolyte may be used together with the organic electrolyte solution. When the organic solid electrolyte and/or the inorganic solid electrolyte are used, the solid electrolyte may serve as a separator in certain cases, and thus, the separator may be omitted.

As the organic solid electrolyte, for example, polyethylene derivatives, polyethylene oxide derivatives, polypropylene oxide derivatives, phosphoric acid ester polymer, polyester sulfide, polyvinyl alcohol, polyvinylidene difluoride may be used.

As the inorganic solid electrolyte, for example, lithium nitride, lithium halogenide, lithium sulfate such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ may be used.

The present disclosure will now be described in greater detail with reference to the following examples. However, the following examples are for illustrative purposes only and shall not limit the scope of this disclosure.

EXAMPLES

Comparative Example 1: Preparation of a Negative Electrode and a Coin Half Cell Using Titanium Oxide Nanoparticles A composition for forming a negative active material layer was prepared by mixing 0.08 g of a commercialized titanium oxide nanoparticle (Degussa, P25) which is a negative active material, 0.01 g of a polyvinylidene difluoride ("PVdF") which is a binder, 0.01 g of a carbon black which is an electroconductive material, and 0.4 g of N-methyl pyrrolidone ("NMP") which is a solvent. Thereafter, the composition for forming the negative active material layer was coated with a thickness of 100 μm on a copper thin film which is a negative electrode current collector, dried for a first time at a temperature of 80° C., then dried for a second time at a temperature of 120° C. under a vacuum atmosphere, and roll-pressed to prepare the negative electrode.

Thereafter, the negative electrode was wound in a cylindrical form with a diameter of 12 mm and prepared a 2032 type coin half cell by using a lithium metal as a counter electrode. Herein, a 1.3 M $LiPF_6$ solution dissolved in a mixed solvent with a volume ratio of 3:5:2 of ethylene carbonate, diethylene carbonate, and dimenthyl carbonate was used as an organic electrolyte solution.

Comparative Example 2: Preparation of a Negative Electrode a Coin Half Cell Using a Titanium Oxide Nanowire Prepared from a Titanium Oxide Nanoparticle A dispersion liquid was obtained by adding 0.45 g of a commercialized titanium oxide nanoparticle (Degussa, P25) which is a negative active material, and 40 milliliters (mL) of 10 M NaOH aqueous solution into a 60 mL Teflon container and dispersing the mixture for 30 minutes. Thereafter, the dispersion liquid was heat treated at a temperature of 150° C. for 72 hours to obtain a sodium titanate sediment (this is referred to as a hydrothermal reaction). Thereafter, the prepared sodium titanate sediment was washed with a 4 liters (L) of distilled water and then stirred for 1 hour in a 0.1 M of hydrochloric acid aqueous solution, and a sodium ion of the sodium titanate particle was replaced with a hydrogen ion, and thereby obtaining a hydrogen titanate sediment (this is referred to as an ion exchange). Thereafter, the hydrogen titanate sediment was heat treated at a temperature of 450° C. for 5 hours to obtain a titanium oxide nanowire. The negative electrode and the coin half cell were prepared in the same manner as in Comparative Example 1, except for using a titanium oxide nanowire as a negative active material.

Comparative Example 3: Preparation of a Negative Electrode and a Coin Half Cell Using a Titanium Oxide Nanotube First, a titanium thin film was anodized in an electrochemical cell including 0.1M of a perchloric acid ($HClO_4$) aqueous solution (electrolyte). In greater detail, the titanium thin film was used in the electrochemical cell as a positive electrode, a platinum thin film was used in the electrochemical cell as a negative electrode, the operating voltage was 20V, and the temperature of the electrolyte was 25° C. After the anodization treatment was completed, the resulting product was washed by centrifugation, dried at a temperature of 80° C., and heat treated at a temperature of 400° C. for 3 hours to obtain a titanium oxide nanotube. Furthermore, the negative electrode and the coin half cell were prepared in the same manner as in Comparative Example 1 except using the titanium oxide nanotube as a negative active material.

Example 1: Preparation of a Negative Electrode and a Coin Half Cell Using Microparticles Including a Cluster of Titanium Oxide Nanotubes First, 0.45 g of titanium oxide nanotube prepared in Comparative Example 3, which is a negative active material, and 40 mL of NaOH aqueous solution with a concentration of 10 M was added into a 60 mL Teflon container and dispersed for 30 minutes to obtain a dispersion liquid. Thereafter, the dispersion liquid was heat treated at a temperature of 150° C. for 72 hours to obtain a sediment of the first microparticle including a cluster of sodium titanium nanotubes (this is referred to as a hydrothermal reaction). Then, the sodium ion of the first microparticle was ion exchanged with a hydrogen ion by washing the sediment with a 4 L of a distilled water and by agitating it in a 0.1 M hydrochloric acid aqueous solution for 1 hour to obtain a sediment of a second microparticle containing a cluster of hydrogen titanate nanotubes (this process is referred to as an ion exchange). Thereafter, the sediment was heat treated (annealed) at a temperature of 450° C. for 5 hours to obtain a third microparticle including a cluster of titanium oxide nanotubes. Then, the negative electrode and the coin half cell were prepared in the same manner as in Comparative Example 1, except using a powder of the third microparticle as a negative active material.

Evaluation Example

Evaluation Example 1: Evaluation of Porosity

With respect to the titanium oxide nanoparticle (P25) used in Comparative Example 1, titanium oxide nanowire ("TNW") prepared in Comparative Example 2, titanium oxide nanotube ("TNT") used in Example 1 (titanium oxide nanotube prepared in Comparative Example 3) and the microparticle ("Micro P") prepared in Example 1, BET specific surface area, pore volume and average pore size (4V/A by BET) were measured by the Brunauer-Emmett-Teller ("BET") and Barrett-Joyner-Halenda ("BJT") methods. The evaluations of micropores and external surface area were performed using the t-plot method. The evaluation results are shown in Table 1.

TABLE 1

|  | BET specific surface area ($m^2/g$) | Pore volume (cc/g) | Average pore size (4 V/A by BET) (nm) |
|---|---|---|---|
| Titanium oxide nanoparticle ("P25") | 50 ± 15 | 0.25 | 20 |
| Titanium oxide nanowire ("TNW") | 24.5 | 0.098899 | 16.147 |
| Titanium oxide nanotube ("TNT") | 73.9514 | 0.29 | 15.686 |
| Microparticle ("Micro P") | 257.2 | 0.64 | 9.953 |

In Table 1, the microparticle prepared in Example 1 (negative active material) has a larger BET specific surface area, a larger pore volume and a smaller average pore size in comparison with the titanium oxide nanoparticle ("P25") used in Comparative Example 1, titanium oxide nanowire ("TNW") prepared in Comparative Example 2, titanium oxide nanotube ("TNT") used in Example 1 (titanium oxide nanotube prepared in Comparative Example 3).

Evaluation Example 2: Evaluation of Volume Average Particle Diameter (D50)

The volume average particle diameters (D50) of titanium oxide nanoparticle ("P25") used in Comparative Example 1 and the microparticle ("Micro P") prepared in Example 1 were measured and the results are shown in Table 2. A MicroTrack HRA device from Nikkiso Co. was used as the measurement device.

TABLE 2

|  | Volume average particle diameter (D50)(μm) |
|---|---|
| Titanium oxide nanoparticle ("P25") | 0.0253 |
| Microparticle ("Micro P") | 14.455 |

Evaluation Example 3: Surface Image Analysis

Figure 2:
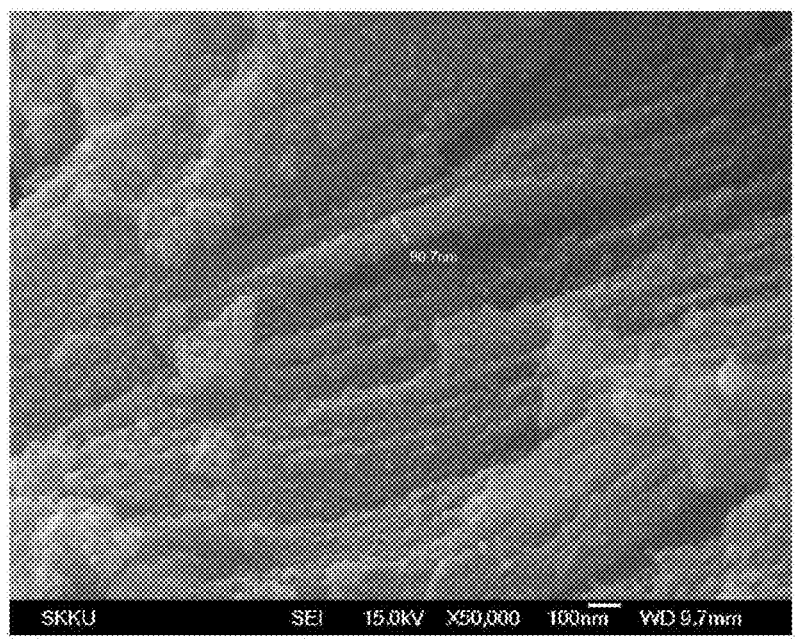
FIG. 2 is a scanning electron microscope ("SEM") photograph of a titanium oxide nanotube used as a starting material in Example 1.
Figure 3A:
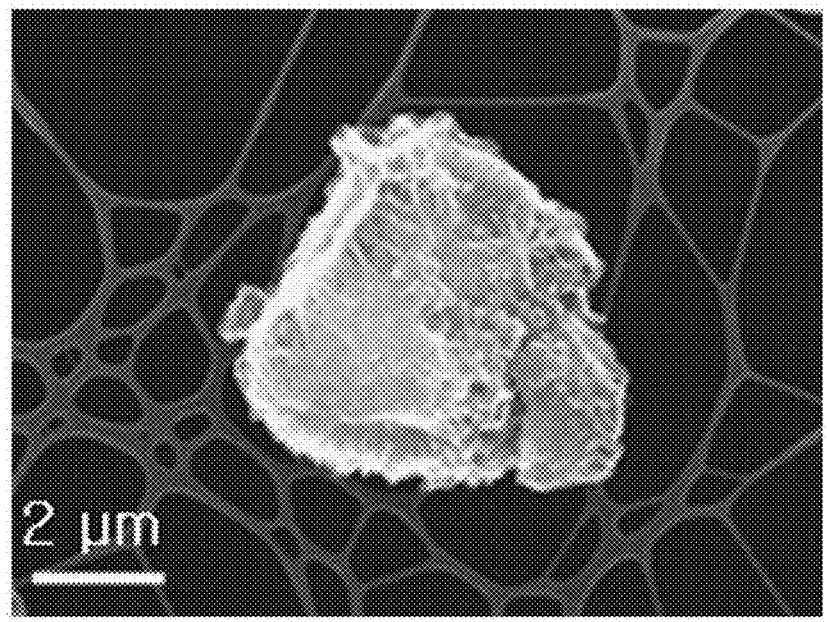
FIGS. 3A to 3C are SEM and transmission electron microscope ("TEM") photographs of the negative active material prepared in Example 1.
Figure 3B:
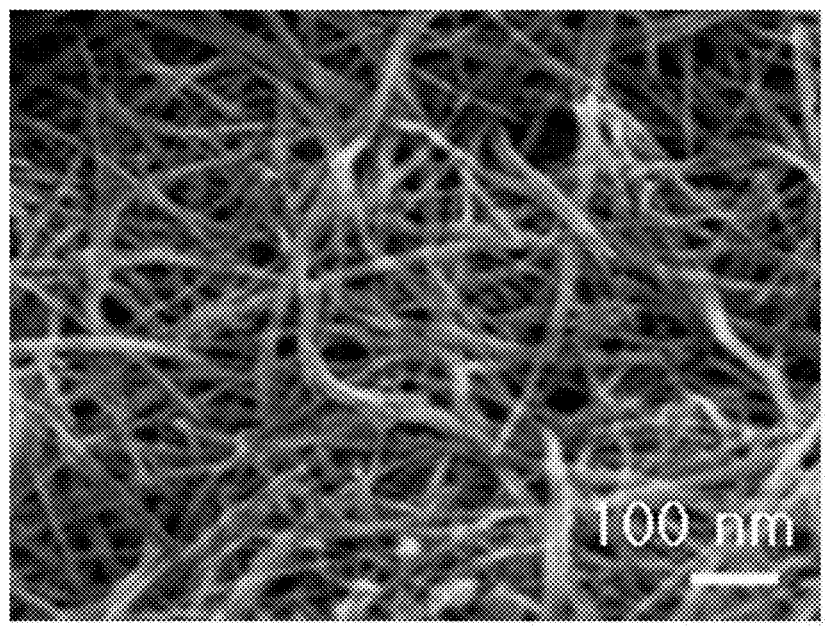
Figure 3C:
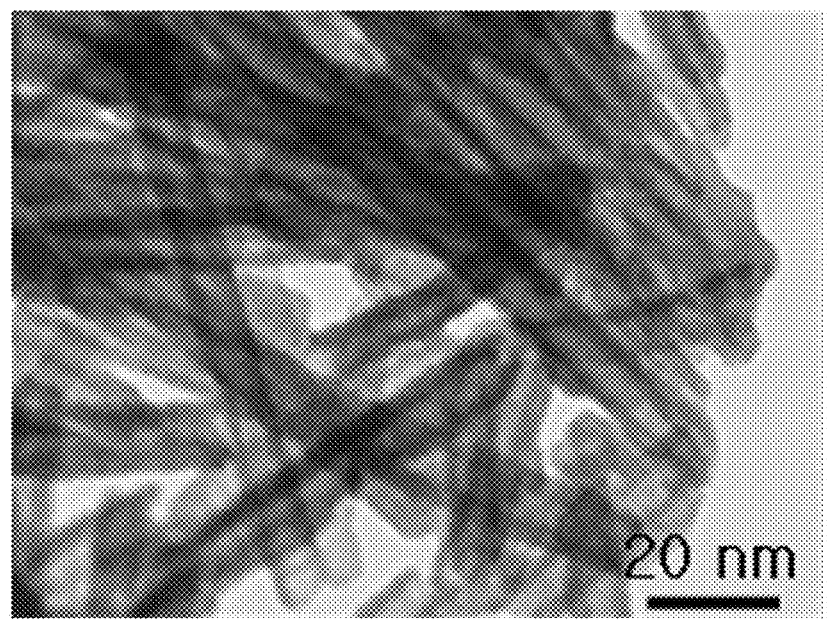

A SEM photograph of the titanium oxide nanotube (titanium oxide nanotube prepared in Comparative Example 3) used as a starting material in Example 1 is shown in FIG. 2. Also, the SEM and TEM photographs of the negative active material prepared in Example 1 are shown in FIGS. 3A to 3C. FIG. 3A is a SEM photograph, FIG. 3B is a magnified SEM photograph, and FIG. 3C is an additionally magnified TEM photograph. The presence of the microparticle may be confirmed in FIG. 3A, and FIGS. 3B and 3C show that the microparticle includes a cluster of nanotubes and has a skein-shaped form.

In FIG. 2 and FIGS. 3A to 3C, the titanium oxide nanotube used as a starting material in Example 1 is present in a form of individual nano-sized particles, whereas the negative active material prepared in Example 1 is present in the form of a microparticle containing a cluster of titanium oxide nanotubes.

Evaluation Example 4: Raman Analysis

Figure 4:
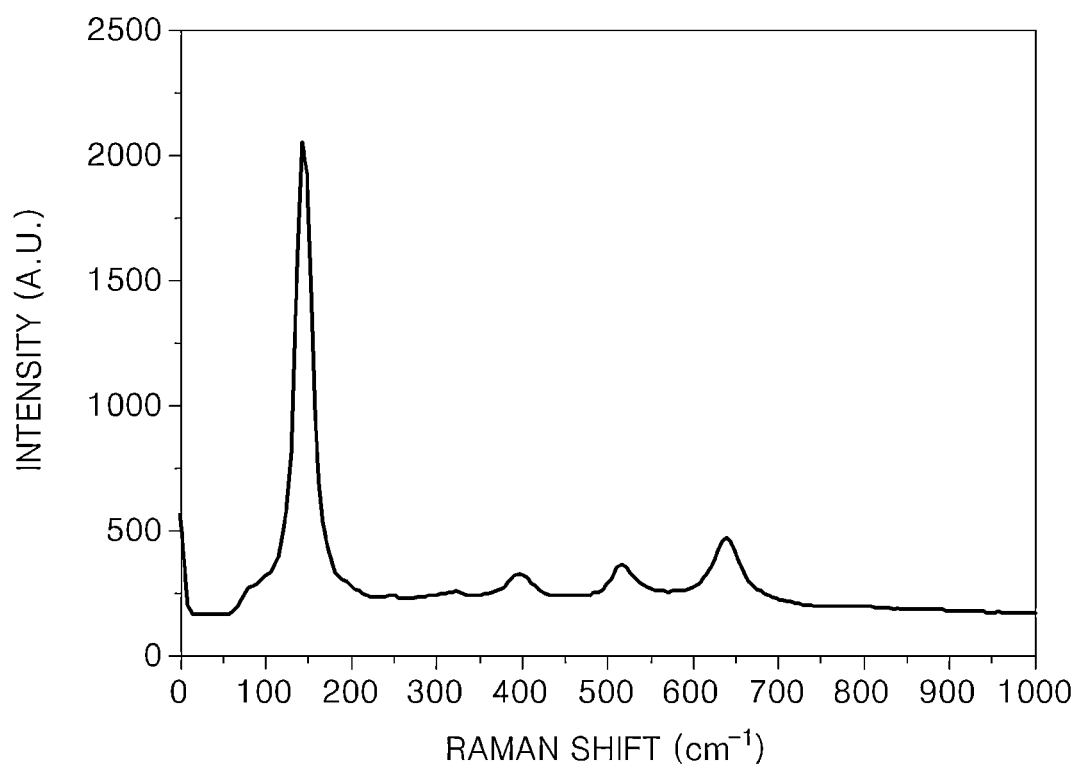
FIG. 4 is graph of intensity (arbitrary units, a.u. versus Raman shift (inverse centimeters, $cm^{-1}$) and is a Raman spectrum of the titanium oxide nanotube prepared in Comparative Example 3.

The Raman spectrum of the titanium oxide nanotube prepared in Comparative Example 3 and the Raman spectrum of the negative active material prepared in Example 1 were measured with a Raman spectrophotometer (TOKYO INSTRUMENT INC, NANOFINDER 30) and the results are shown in FIG. 4 and FIG. 5, respectively. Also, for comparative purposes, the Raman spectrum of the anatase-type titanium dioxide (source: A Comparison of Quantum-Sized Anatase and Rutile Nanowire Thin Film, Milena Jankulovska, Electrochimica Acta, vol 62, pp. 172-180, 2012 Dec. 13) and the Raman spectrum of the bronze-type titanium dioxide (source: $TiO_2$—B Nanowires, A. Robert Armstron, Angew. Chem. Int. Ed. 43, pp. 2286-2288, 2004 Apr. 19) (the contents of which are incorporated herein by reference in their entirety) are shown in FIG. 6 and FIG. 7, respectively.

As shown in FIGS. 4 and 5, there are certain discordance areas (for example, a characteristic peak located at a Raman shift between about 680 $cm^{-1}$ and about 750 $cm^{-1}$) between the Raman spectrum of the negative active material prepared in Example 1 (FIG. 5) and the Raman spectrum of the titanium oxide nanotube prepared in Comparative Example 3 (FIG. 4).

As shown in FIGS. 4 and 6, the Raman spectrum of the titanium oxide nanotube prepared in Comparative Example 3 (FIG. 4) almost matches the Raman spectrum of the anatase-type titanium oxide.

Figure 7:
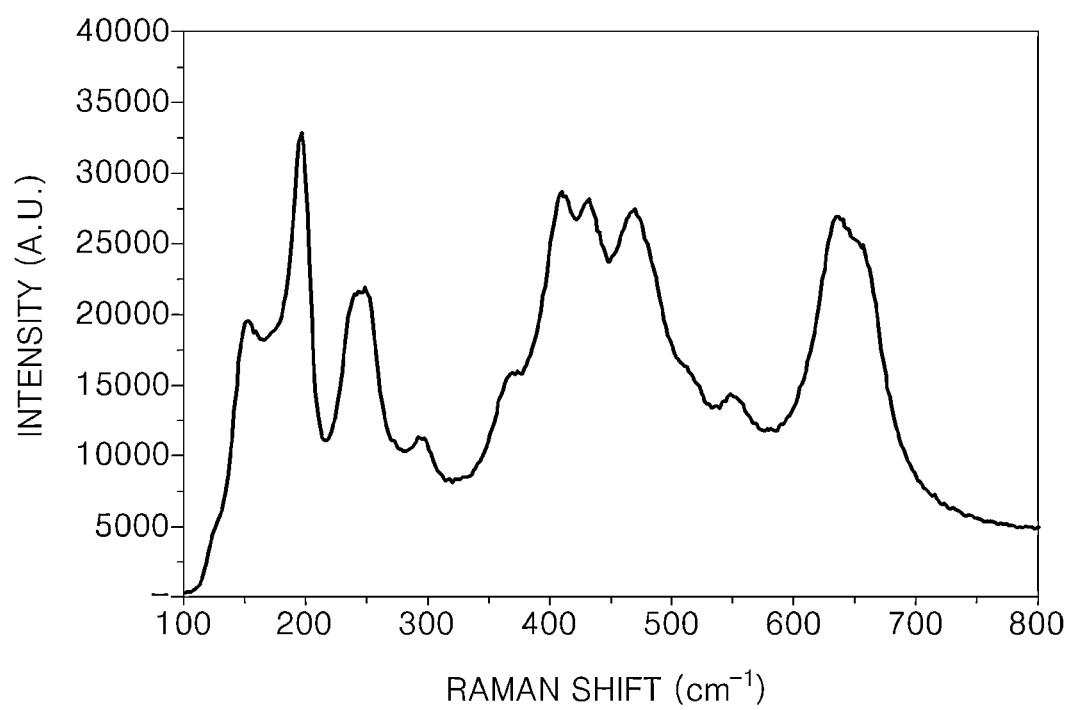
FIG. 7 is graph of intensity (arbitrary units, a.u. versus Raman shift (inverse centimeters, $cm^{-1}$) and is a Raman spectrum of a bronze-type titanium oxide.

As shown in FIGS. 5 to 7, the Raman spectrum of the negative active material prepared in Example 1, has another characteristic peak (a characteristic peak located at a Raman shift between about 680 $cm^{-1}$ to about 750 $cm^{-1}$) as well as a characteristic peak of the anatase-type titanium oxide (see *) and a characteristic peak of bronze-type titanium dioxide (see #). As a result, the negative active material prepared in Example 1 may be a complex of an anatase-type titanium oxide, a bronze-type titanium dioxide, and another type titanium oxide with a different crystal structure from the anatase-type titanium oxide and the bronze-type titanium dioxide.

Evaluation Example 5: Evaluation of Charge and Discharge Characteristic

The charge and discharge characteristics of coin half cells prepared in Example 1 and Comparative Examples 1 to 3 were evaluated using a charger/discharger (manufacturer: TOYO, model: TOYO-3100). In greater detail, each coin half cell was charged in the first cycle at a rate (C-rate) of 0.1 C (unit: mA/g) until the voltage reached 1.0 V and charged further until the current reached 0.01 C under a constant voltage of 1.0 V. Then, 10 minutes of rest was maintained for each coin half cell. Thereafter, each coin half cell was discharged at a rate of 0.1 C until the voltage reached 2.5 V. The term "C" used herein refers to the discharge rate of the cell and it is calculated by dividing the total capacity of the cell by the total discharge time.

Figure 8:
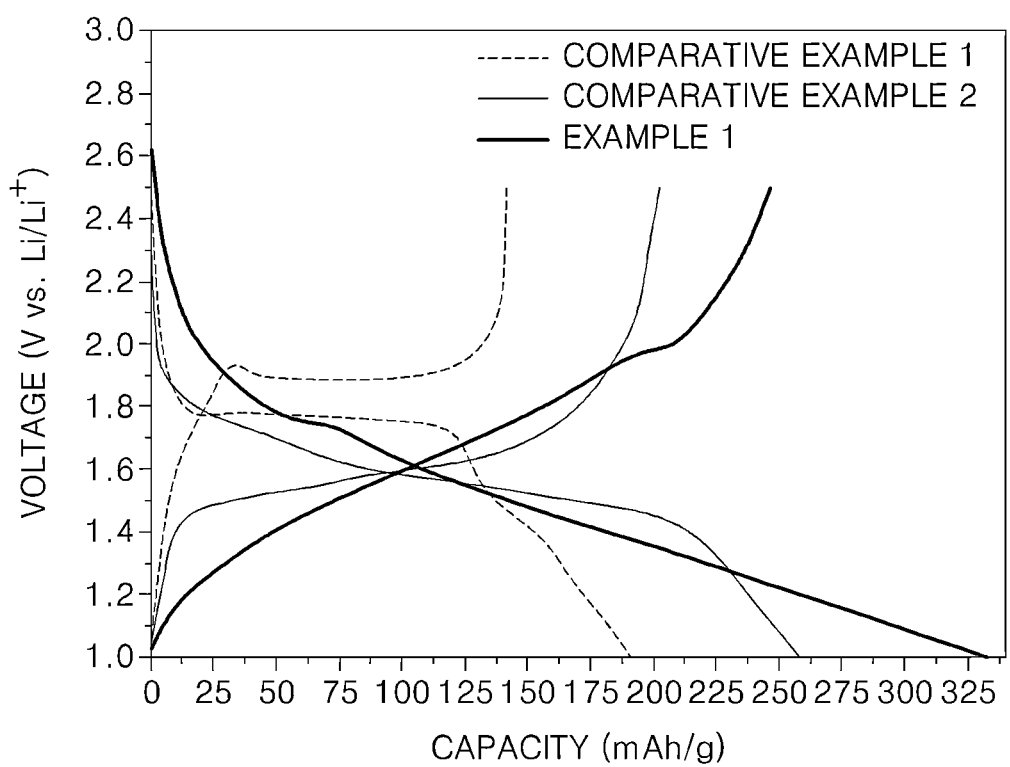
FIG. 8 is a graph of voltage (volts versus Li/Li$^+$) versus capacity (milliampere-hours per gram, mAh/g) which shows the charge and discharge characteristics of coin half cells prepared in Example 1 and Comparative Examples 1 and 2.

The evaluation of the charge and discharge characteristic of the coin half cells prepared in Example 1 and Comparative Examples 1 and 2 is shown in FIG. 8.

As shown in FIG. 8, the coin half cell prepared in Example 1 has a better charge and discharge characteristics than the coin half cells prepared in Comparative Examples 1 and 2.

Also, the discharge capacity of the coin half cells prepared in Example 1 and Comparative Examples 1 to 3 was evaluated and the results are shown in Table 3.

TABLE 3

|  | Comparative Example 1 | Comparative Example 2 | Comparative Example 3 | Example 1 |
|---|---|---|---|---|
| Discharge capacity (mAh/g) | 142 | 203 | 185 | 246 |

As shown in Table 3, the discharge capacity of the coin half cell prepared in Example 1 is higher than the discharge capacity of the coin half cells prepared in Comparative Example 1 to 3.

Figure 9:
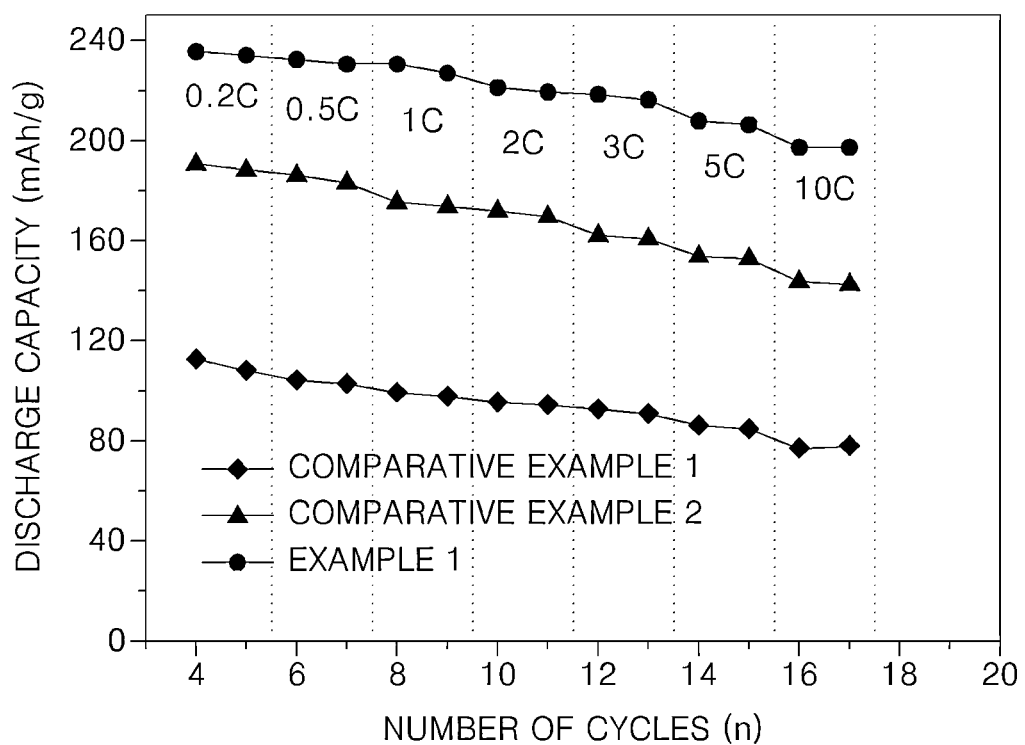
FIG. 9 is a graph of discharge capacity (mAh/g) versus number of cycles which shows the changes in the discharge capability of the coin half cells prepared in Example 1 and Comparative Examples 1 and 2, in accordance with the number of cycles.
Figure 10:
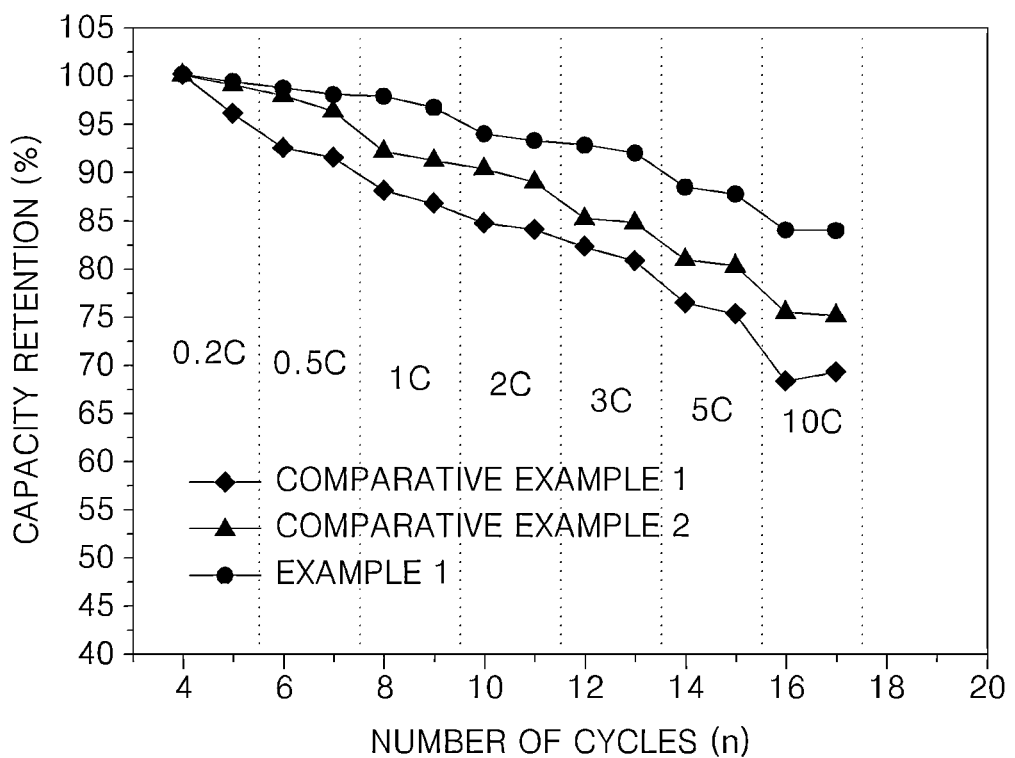
FIG. 10 is a graph of capacity retention (percent, %) versus number of cycles which shows changes in the capacity retention of the coin half cells prepared in Example 1 and Comparative Examples 1 and 2 in accordance with the number of cycles.

Evaluation Example 6: Evaluation of High Rate Discharge Characteristic of the Coin Half Cells The coin half cells prepared in Example 1 and Comparative Examples 1 and 2 were charged with a constant current (0.1 C), and a constant voltage (1.0 V, 0.01 C cut-off). Then, 10 minutes of rest was maintained. Next, the coin half cells were each discharged at a constant current (0.2 C, 0.5 C, 1 C, 2 C, 3 C, 5 C or 10 C) until the voltage reached 2.5 V. Then, the high rate discharge characteristic of each coin half cell was measured by changing the discharge rate periodically to 0.2 C, 0.5 C, 1 C, 2 C, 3 C, 5 C, and 10 C whenever the number of the charge and discharge cycle was increased. However, when charged and discharged for one to three times, each coin half cell was discharged at a rate of 0.1 C. The high rate discharge characteristic during this time is shown in FIGS. 9 and 10. Regarding FIGS. 9 and 10, the term "C" used herein refers to the discharge rate of the cell that is calculated by dividing the total capacity of the cell by the total discharge time. Also, regarding FIG. 10, the "capacity retention" may be calculated according to Formula 1.

Capacity retention (%)=(discharge capacity when the cell is discharged at a predetermined rate(C) in an $n^{th}$ charge and discharge cycle)/(discharge capacity when the cell is discharged at a rate of 0.2 C in the $4^{th}$ charge and discharge cycle) *100 wherein, $n$ is a natural number.     Formula 1

As shown in FIGS. 9 and 10, the coin half cell prepared in Example 1 has a greater high rate discharge characteristic than the coin half cells prepared in Comparative Examples 1 and 2. The expression, "greater high rate discharge characteristic" refers to a smaller reduction ratio of the discharge capacity in accordance with the increase in the discharge rate. Also, the term "discharge" used herein refers to a process whereby lithium ions exit a negative electrode.

According to an aspect, because the negative active material exists in a microparticle form, a binder content may be decreased during a slurry formation and also the microparticle has a larger specific surface area and a high activity because it includes a cluster of a plurality of titanium oxide nanotubes.

It should be understood that the exemplary embodiments described therein should be considered in a descriptive sense only and not for purposes of limitation. Descriptions of features, advantages, or aspects within each embodiment shall be considered as available for other similar features, advantages, or aspects in other embodiments.

What is claimed is:

1. A negative electrode comprising a negative active material, the negative active material comprising: a plurality of titanium oxide nanotubes comprising a bronze-type titanium dioxide,
wherein a Raman spectrum of the negative active material comprises a characteristic peak located at a Raman shift between about 680 cm$^{-1}$ and about 750 cm$^{-1}$, and
wherein the plurality of titanium oxide nanotubes are represented by Formula 1

$Ti_{1+x}O_{2+y}$     Formula 1 wherein, x and y respectively satisfy $-0.2 \le x \le 0.2$ and $-0.2 \le y \le 0.2$,
wherein titanium oxide nanotubes are in a form of a microparticle,
wherein the microparticle comprises a cluster of the plurality of titanium oxide nanotubes, and
wherein the negative active material is a product of:
hydrothermally contacting a first titanium oxide nanotube and an alkali metal hydroxide to prepare a first microparticle comprising a cluster of alkali metal titanate nanotubes;
exchanging an alkali metal ion of the first microparticle with a hydrogen ion to prepare a second microparticle comprising a cluster of hydrogen titanate nanotubes; and
annealing the second microparticle to prepare the microparticle comprising the cluster of the plurality of titanium oxide nanotubes to prepare the negative active material.

2. A lithium secondary battery comprising the negative electrode of claim 1.

3. The negative electrode of claim 1, wherein the Raman spectrum of the negative active material further comprises a characteristic peak of anatase titanium dioxide.

4. The negative electrode of claim 1, wherein the microparticle is a skein-shaped particle.

5. The negative electrode of claim 4, wherein the microparticle has a volume average particle diameter (D50) in a range of about 1 micrometer to about 20 micrometers.

6. The negative electrode of claim 5, wherein an average aspect ratio of the plurality of titanium oxide nanotubes is about 100,000,000 to about 10.

7. The negative electrode of claim 4, wherein the negative active material has a specific surface area in a range of about 230 square meters per gram to about 300 square meters per gram and a pore volume in a range of about 0.4 cubic centimeters per gram to about 0.9 cubic centimeters per gram.

8. The negative electrode of claim 1, wherein the negative active material is a product of annealing at a temperature in a range of greater than 400° C. to 550° C.

9. The negative electrode of claim 8, wherein the negative active material is a product of annealing at a temperature of about 450° C.

10. The negative electrode of claim 1, wherein the first titanium oxide nanotube has a specific surface area in a range of about 30 square meters per gram to about 100 square meters per gram, a pore volume in a range of about 0.1 cubic centimeters per gram to about 0.6 cubic centimeters per gram and an average pore size in a range of about 9 nanometers to about 15 nanometers.

11. The negative electrode of claim 1, further comprising anodizing and heat treating a titanium thin film to prepare the first titanium oxide nanotube.

12. The negative electrode of claim 11, wherein the heat treating is performed at a temperature of about 350° C. to about 500° C.

13. The negative electrode of claim 1, wherein the annealing is performed at a temperature of about 300° C. to about 500° C.

14. The negative electrode of claim 1, wherein a Raman spectrum of the plurality of titanium oxide nanotubes and a Raman spectrum of the first titanium oxide nanotube are different.

15. The negative electrode of claim 1, wherein the alkali metal hydroxide is sodium hydroxide.

16. A negative electrode comprising:
a composite of a negative active material comprising
a plurality of titanium oxide nanotubes comprising a bronze-type titanium dioxide,
wherein a Raman spectrum of the negative active material comprises a characteristic peak located at a Raman shift between about 680 cm$^{-1}$ and about 750 cm$^{-1}$, and
wherein the plurality of titanium oxide nanotubes are represented by Formula 1

$$Ti_{1+x}O_{2+y} \quad \text{Formula 1}$$

wherein, x and y respectively satisfy $-0.2 \leq x \leq 0.2$ and $-0.2 \leq y \leq 0.2$, wherein titanium oxide nanotubes are in a form of a microparticle, and wherein the microparticle comprises a cluster of the plurality of titanium oxide nanotubes; and a binder, wherein the composite is disposed on a current collector, and wherein the negative active material is a product of:

hydrothermally contacting a first titanium oxide nanotube and an alkali metal hydroxide to prepare a first microparticle comprising a cluster of alkali metal titanate nanotubes;

exchanging an alkali metal ion of the first microparticle with a hydrogen ion to prepare a second microparticle comprising a cluster of hydrogen titanate nanotubes; and annealing the second microparticle to prepare the microparticle comprising the cluster of the plurality of titanium oxide nanotubes to prepare the negative active material.

* * * * *